(12) United States Patent
Kim

(10) Patent No.: US 6,211,867 B1
(45) Date of Patent: Apr. 3, 2001

(54) METHOD AND APPARATUS FOR CONTROLLING SWITCHING TIMING OF POWER RECOVERY CIRCUIT IN AC TYPE PLASMA DISPLAY PANEL SYSTEM

(75) Inventor: Se-Yong Kim, Seoul (KR)

(73) Assignee: Daewoo Electronics Co., Ltd., Seoul (KR)

(*) Notice: Subject to any disclaimer, the term of this patent is extended or adjusted under 35 U.S.C. 154(b) by 0 days.

(21) Appl. No.: 09/243,447

(22) Filed: Feb. 3, 1999

(30) Foreign Application Priority Data

Jun. 30, 1998 (KR) .................................................. 98-25725

(51) Int. Cl.$^7$ ...................................................... G09G 5/00
(52) U.S. Cl. ......................... 345/211; 345/66; 315/169.4
(58) Field of Search ............................... 345/211, 66, 68; 315/169.3, 169.4; 348/730

(56) References Cited

U.S. PATENT DOCUMENTS

| | | | |
|---|---|---|---|
| 5,424,612 | * 6/1995 | Kim | 315/169.3 |
| 5,555,032 | * 9/1996 | Kung | 348/730 |
| 5,559,402 | * 9/1996 | Corrigan, III | 315/169.3 |
| 5,654,728 | * 8/1997 | Kanazawa et al. | 345/68 |
| 5,739,641 | * 4/1998 | Nakamura et al. | 315/169.1 |
| 6,028,573 | * 2/2000 | Orita et al. | 345/66 |
| 6,034,482 | * 3/2000 | Kanazawa et al. | 315/169.4 |

FOREIGN PATENT DOCUMENTS

| | | |
|---|---|---|
| 0 837 442 | 4/1998 | (EP) . |
| 2 317 736 | 4/1998 | (GB) . |

* cited by examiner

Primary Examiner—Steven Saras
Assistant Examiner—Uchendu O. Anyaso
(74) Attorney, Agent, or Firm—Pillsbury Winthrop LLP

(57) ABSTRACT

A method and an apparatus for variably controlling a switching timing of a power recovery circuit of a plasma display panel television is disclosed. A variableness range pulse generating section generates a variableness range pulse which determines a maximum variableness range of a recovered power applying time. A first counter counts a clock signal in response to the variableness range pulse and periodically outputs a counted value. Second and third counters count a switching time of first and second switches, respectively, and sets first and second reference values. A rising pulse generating section periodically compares the counted value with the first reference value and converts a logic level of an output signal from low to high when the counted value is identical with the first reference value. A falling pulse generating section periodically compares the counted value with the second reference value and converts a logic level of an output signal from high to low. An AND-gate logically multiplies an output of the rising pulse generating section and an output of the falling pulse generating section to generate a control signal. A pulse sustentation period of the control signal is determined by the first and second reference values which can be variably determined from an outside.

4 Claims, 6 Drawing Sheets

METHOD AND APPARATUS FOR CONTROLLING SWITCHING TIMING OF POWER RECOVERY CIRCUIT IN AC TYPE PLASMA DISPLAY PANEL SYSTEM

BACKGROUND OF THE INVENTION

1. Field of the Invention

The present invention relates to a plasma display panel (hereinafter, referred to as "PDP") system, and more particularly, to a method and an apparatus which is capable of efficiently using power need to drive electrodes of the PDP.

2. Description of the Prior Art

In general, the PDP is classified into an AC type PDP and a DC type PDP according to a driving voltage applied to a discharge cell. The AC type PDP is driven by a sine wave alternating current or a pulse voltage whereas the DC type PDP is driven by a direct current. Since electrodes of the AC type PDP are covered with a dielectric and do not receive an ion damage according to the discharge, a life span of the electrodes of the AC type PDP is longer than that of the DC type PDP. Also, the AC type PDP memorizes a wall charge generated on a surface of the dielectric by a polarization into an inside cell.

A color AC type PDP which is mainly used for a broad screen television has a front panel and a rear panel. The front panel has a scan and sustentation electrode (hereinafter, referred to as Y) and a sustentation electrode (hereinafter, referred to as X) which are designed on a glass substrate in parallel. The rear panel has a cell space for sealing gas and an R-G-B address electrode (hereinafter, referred to as Z) which is designed on a rear glass substrate.

In order to drive the PDP, a DC high voltage has to be periodically applied between the X and Y electrodes to sustain the discharge between the X and Y electrodes. The two electrodes operate as a capacitor, so that a power applied to the two electrodes is not perfectly consumed. Accordingly, the PDP recovers an electric charge remained between the X and Y electrodes to decrease the power consumption of the PDP. A circuit recovers the applied power after applying the power to the X and Y electrodes and applies the recovered power to the X and Y electrodes in order to decrease the power consumption which is called to power recovery circuit.

The power recovered by the power recovery circuit is overlapped with the DC high voltage for driving the electrodes and is applied to the electrodes with the DC high voltage. At this time, for an efficient use of the power, a timing for applying the recovered power to the electrodes is very important concerning an applying timing of the DC high voltage.

In a case where the timing of the recovered power is faster than the applying timing of the DC high voltage, a waveform of the applied voltage is distorted and recycling rate of the recovered power decreases. On the contrary, in a case where the timing of the recovered power is slower than the applying timing of the DC high voltage, the recycling rate of the recovered power decreases since the DC high voltage is applied to the electrodes before the recovered power is efficiently applied.

However, since the applying timing of the recovered circuit is fixed by a configuration of a hardware of the power recovery circuit, the recovered power can not be efficiently used in the prior power recovery circuit.

SUMMARY OF THE INVENTION

Therefore, it is an object of the present invention, in a case where the electrodes driving power of the PDP recovered by using the power recovery circuit is supplied to the electrodes, to provide a method and an apparatus that a user can variably set a supplying timing of the recovered electrodes driving power to be corresponded the characteristics of the PDP.

In order to achieve the above object, a method for controlling a power recovery of a plasma display panel television, which is capable of recovering a power applied to scan/sustentation electrodes, sustentation electrodes and address electrodes and applying the recovered power to the electrodes in response to a control signal, said method comprising the steps of:

1) setting a maximum variableness range of a recovery power supplying time;
2) memorizing first and second reference values which respectively represent starting and stopping points of the recovery power supplying time;
3) sequentially counting a predetermined clock signal from a starting point of the maximum variableness range within the maximum variableness range;
4) periodically comparing a counted value counted in step 3) with the first and second reference values, respectively, and calculating a first time when the counted value is equal to the first reference value and a second time when the counted value is equal to the second reference value; and
5) making the control signal for supplying the recovery power to the electrodes between the first time and the second time, wherein the first and second reference values are variably set from an outside.

In order to achieve the above object, an apparatus for controlling a supplying timing of a power recovery of a plasma display panel television, which is capable of recovering a power applied to scan/sustentation electrodes, sustentation electrodes and address electrodes and applying the recovered power to the electrodes in response to a control signal, said apparatus comprising:

a first means for generating a variableness range pulse which sets a maximum variableness range of a recovery power supplying time;

a second means for counting a first clock pulse and for periodically outputting the counted value in response to the variableness range pulse;

a third means for generating a first reference value which sets a rising timing of the control signal;

a fourth means for generating a second reference value which sets a falling timing of the control signal;

a fifth means for periodically comparing the counted value with the first reference value and for converting a logic level of an output signal from a low level into a high level when the counted value is equal to the first reference value;

a sixth means for periodically comparing the counted value with the second reference value and for converting the logic level of an output signal from the high level into the low level when the counted value is equal to the second reference value; and a seventh means for logically multiplying the output signal from said fifth and the output signal from said sixth means to generate the control signal, wherein the first and second references values are variably set from an outside.

The third means has a first switching means for executing a switching operation by a first predetermined time set from an outside, and a first counting means for counting switching times of said first switching means and for generating the first reference value. The fourth means has a second switching means for executing a switching operation by a second predetermined time set from the outside, and a second counting means for counting switching times of said second switching means and for generating the second reference value. The first and second switching means have a toggle switch, respectively. The user can set an optimum supplying timing of the recovery power by operating the toggle switch until an optimum screen is displayed. Consequently, driving power of the electrodes can be efficiently used.

BRIEF DESCRIPTION OF THE DRAWINGS

The above object and other advantages of the present invention will become more apparent by describing in detail a preferred embodiment thereof with reference to the attached drawings, in which.

DESCRIPTION OF THE PREFERRED EMBODIMENT

A description will be given below in detail with reference to accompanying drawings to a configuration and an operation of a method and an apparatus for controlling switching timing of a power recovery circuit in an AC type plasma display panel system according to an embodiment of the present invention.

Figure 1:
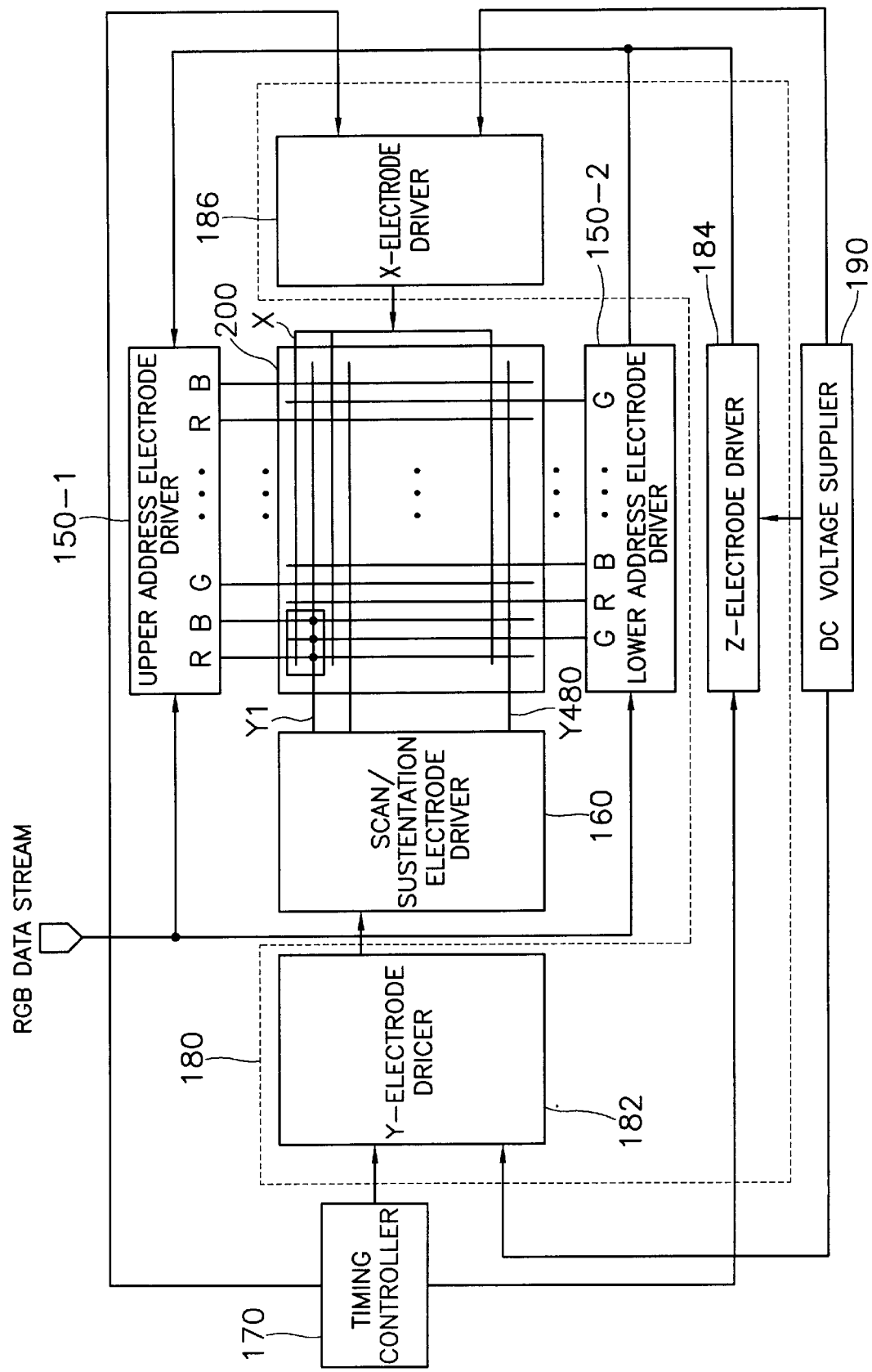
FIG. 1 is a block diagram for showing a circuit diagram relating to electrodes driving in configurations of a PDP-TV.

In FIG. 1, a conventional AC type color PDP-TV has an audio/video section relating to data process, an analog/digital converting section, a memory section and a data interfacing section (not shown). The conventional AC type color PDP-TV has upper and lower address electrode driving sections 150-1 and 150-2 for display RGB data processed through the respective sections on a three electrodes surface discharge color panel 200, a scan and sustentation driving section 160, a timing control section 170, a high voltage driving circuit section 180 and an AC-DC converting section 190.

Upper address electrode driving section 150-1 applies address pulses to odd-numbered address electrodes of three surface discharge PDP 200 according to a "high level signal" or a "low level signal" of RGB data inputted from the data interfacing section. Lower address electrode driving section 150-2 applies address pulses to even-numbered address electrodes of three surface discharge PDP 200 according to "high level signal" or "low level signal" of the RGB data inputted from the data interfacing section.

Scan and sustentation electrode driving section 160 applies a scan pulse and a sustentation pulse to the scan and sustentation electrodes (Y electrode) of three electrode surface discharge color PDP 200, respectively.

Timing control section 170 generates various logic control pulses which are needed to control the PDP system. Particularly, timing control section 170 generates the logic control pulse relating to the power recovery of the present invention and applies to high voltage driving circuit section 180.

High voltage driving circuit section 180 has a Y-electrode driving section 182, a Z-electrode driving section 184 and an X-electrode driving section 186. Respective electrode driving sections 182, 184 and 186 apply a DC high voltage according to the logic control pulse inputted from timing control section 170. High voltage driving circuit section 180 synthesizes the DC voltage supplied from DC voltage supply section 190 according to the various logic control pulses outputted from timing control section 170 in order to generate a high voltage control pulse. The high voltage control pulse is supplied to upper and lower address electrode driving sections 150-1 and 150-2 and scan and sustentation electrode driving section 160 and three electrodes surface discharge color PDP 200 is driven. Also, a voltage level of a data stream supplied from the data interfacing section to address electrode driving sections 150-1 and 150-2 is boosted by high voltage driving section 180.

DC voltage supplying section 190 supplies a direct current required from respective sections of the system and can use an alternating current (220V AC, 60 Hz) as an input.

Three electrodes surface discharge color PDP 200 uses a panel of which the display size is 640×3(R, G, B)×480. In the three electrodes, X-electrode is called a bus electrode and a sustentation pulse is applied to the X-electrode, the scan and sustentation electrode (Y) has electrodes of 480 lines corresponding to Y1 to Y480 and can sequentially scans the 480 lines, and the Z-electrode has three electrodes corresponding to R, G and B per pixel and has 2040 lines in total.

Figure 2:
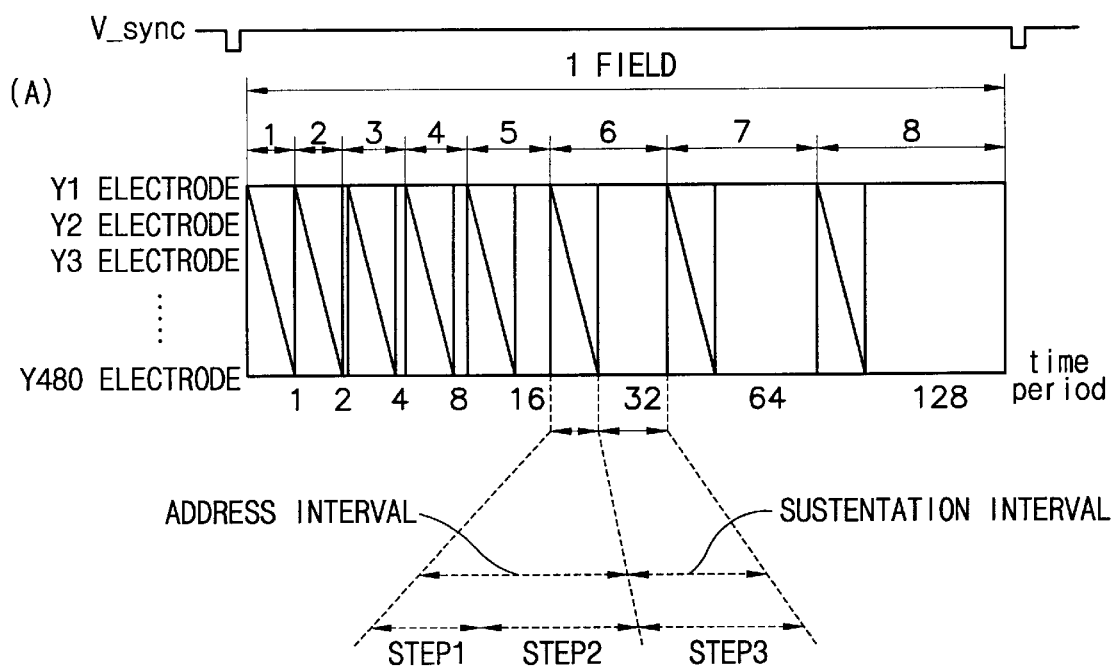
FIG. 2 is a view for illustrating a gray scale display method in the PDP-TV.
Figure 2:
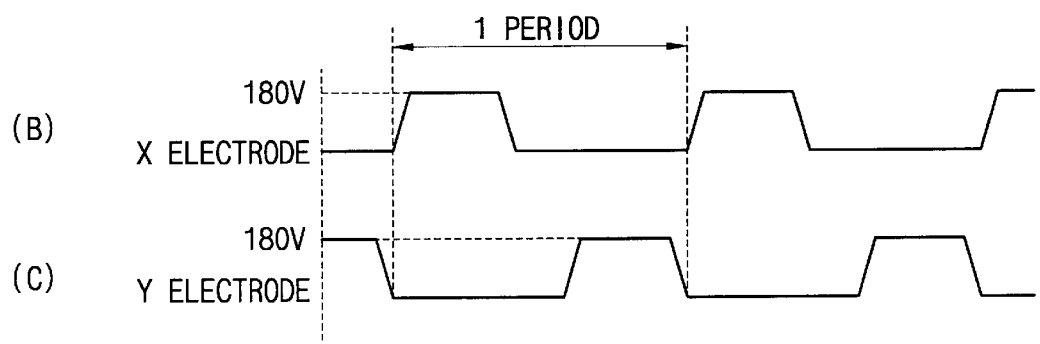

FIG. 2(A) is a view for illustrating a gray scale display method in the PDP-TV and a horizontal axis represents a time. The PDP displays the gray scale of the screen by dividing one field into 8 units of subfields and by differentiating discharge times because the PDP has only a discharge state or non-discharge state. At this time, Each of the subfields has an address interval and a discharge sustentation interval. The discharge sustentation interval increases in a form of $2^n$ (n=0–7). The PDP can display a scale (Namely, 8 bits scale) corresponding to 0 to 255 by synthesizing the sustentation interval. One field placed between vertical synchronizations Vsync is classified into 8 subfields and an operation of each of the subfields executes in three steps. A first step is a whole screen writing step or erasing step. In this step, an initializing operation, which erases the wall charge remained in the selected pixel or charges the erased wall charge into the selected pixel, is executed after sustaining the discharge of a previous subfield. A second step is a data writing step. In this step, the PDP sequentially shifts the scan pulse to Y-electrodes Y1–Y480 and selectively makes the wall charge in the pixel by writing or erasing the data through the Z-electrodes. A third step is a discharge sustentation step. In this step, the PDP alternately applies the sustentation pulse to the X-electrodes and the Y-electrodes and sustains the discharge of the pixel which is made the wall charge. FIGS. 2(B) and (C) show the waveform of the DC high voltage of the X-electrodes and Y-electrodes. The applied voltage is lower than a discharge starting voltage and is higher than a minimum sustentation voltage. That is, the applied voltage is 180 volts.

Figure 3:
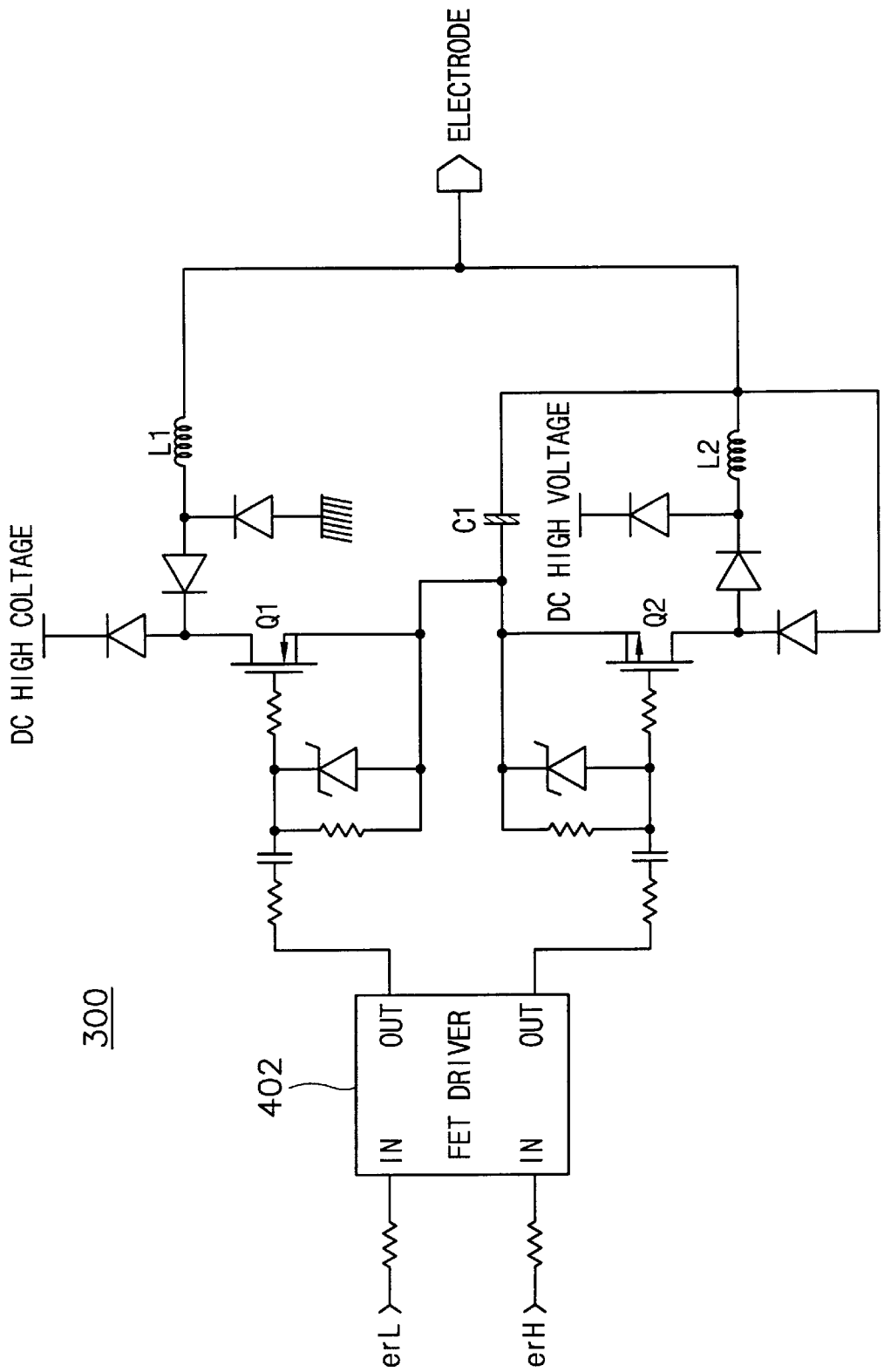
FIG. 3 is a view for showing a circuit diagram of the power recovery circuit according to the present invention.

FIG. 3 is a view for showing a circuit diagram of the power recovery circuit according to the present invention. Power recovery circuit 300 has a field effect transistor (hereinafter, referred to as "FET") driving section 402 for driving a FET according to a recovery control pulse erL and an applying control pulse erH, a recovery FET Q1 for providing a path of which an electric charge remained in an electrode is recovered when recovery FET Q1 is turned on according to the output of FET driving section 402, a capacitor C1 for storing the recovered electric charge, an applying FET Q2 for providing a path of which the recovered electric charge stored in capacitor C1 is applied to the electrode when applying FET Q2 is turned on according to the output of FET driving section 402. Recovery control pulse erL and applying control pulse erH are supplied by timing control section 170.

In FIG. 3, recovery FET Q1 is turned on when recovery control pulse erL is inputted from timing control section 170, so that the electric charge accumulated in the electrode is stored in capacitor C1 through a coil L1 and recovery FET Q1. In a state where the recovered electric charge is accumulated in capacitor C1, applying FET Q2 is turned on when applying control pulse erH inputted from timing control section 170, so that the electric charge accumulated in capacitor C1 is applied to the electrode through applying FET Q2 and a coil L2. As described above, the recovery and applying operation is periodically executed.

Figure 4:
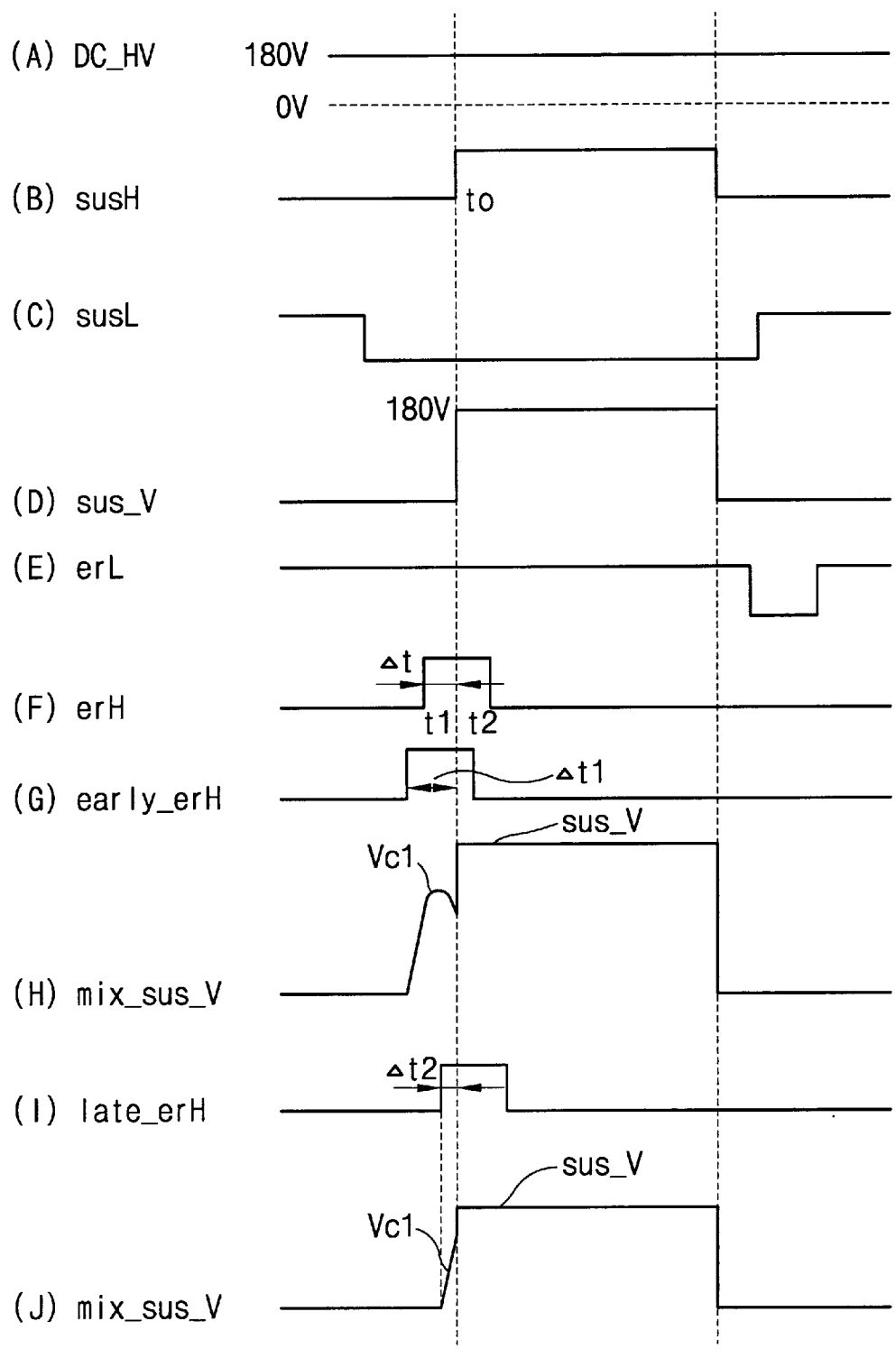
FIG. 4 is a waveform view of a logic control pulse for illustrating the operation of the power recovery circuit.

FIG. 4 is a waveform view of a logic control pulse for illustrating the operation of the power recovery circuit. A DC high voltage DC_HV outputted from DC voltage supplying section 190 is applied to X and Y electrodes while a level of a sustentation voltage control pulse susH for controlling an application of the sustentation voltage is high. Accordingly, a sustentation voltage sus_V applied to the X and Y electrodes has the waveforms as shown in FIG. 4(D). At this time, logic control pulse susL executes a function for preventing the sustentation voltage sus_V from being applied to other electrodes. Meanwhile, recovery control pulse erL which determines a recovery timing of the driving power applied to the X and Y electrodes and applying control pulse erH which determines an applying timing for applying the recovered power to the electrodes has waveforms as shown in FIG. 4(E) and (F), respectively. The timing of applying control pulse erH is overlapped with a rising edge of sustentation voltage control pulse susH and the timing of recovery control pulse erL is slower than a falling edge of sustentation voltage control pulse susH. A size of a time difference Δt between a pulse on time $t^1$ of applying control pulse erH and a pulse on time to of sustentation voltage control pulse susH affects a recycling efficiency of the recovered power. However, as described above, the pulse on time $t^1$ relating to the timing of applying control pulse erH can not be variably set. As shown in FIGS. 4(G) and (H), if the applying timing of the recovery power is fast, the time difference between the applying timing of the recovery power and the applying timing of sustentation voltage sus_V increases. Accordingly, since a recovery voltage Vc1 applied to the electrodes from capacitor C1 consumes before sustentation voltage sus_V is applied to the electrodes, the recycling efficiency of recovery voltage Vc1 decreases. On the contrary, if the applying timing of the recovery power is slow, sustentation voltage sus_V is applied to the electrodes before recovery voltage Vc1 is efficiently applied to the electrodes as shown in FIGS. (I) and (J), so that the recycling efficiency of recovery voltage Vc1 decreases. Accordingly, the present invention provides an applying timing control circuit 700 that the user can variably control the applying timing of the recovery voltage as shown in FIG. 5.

Figure 5:
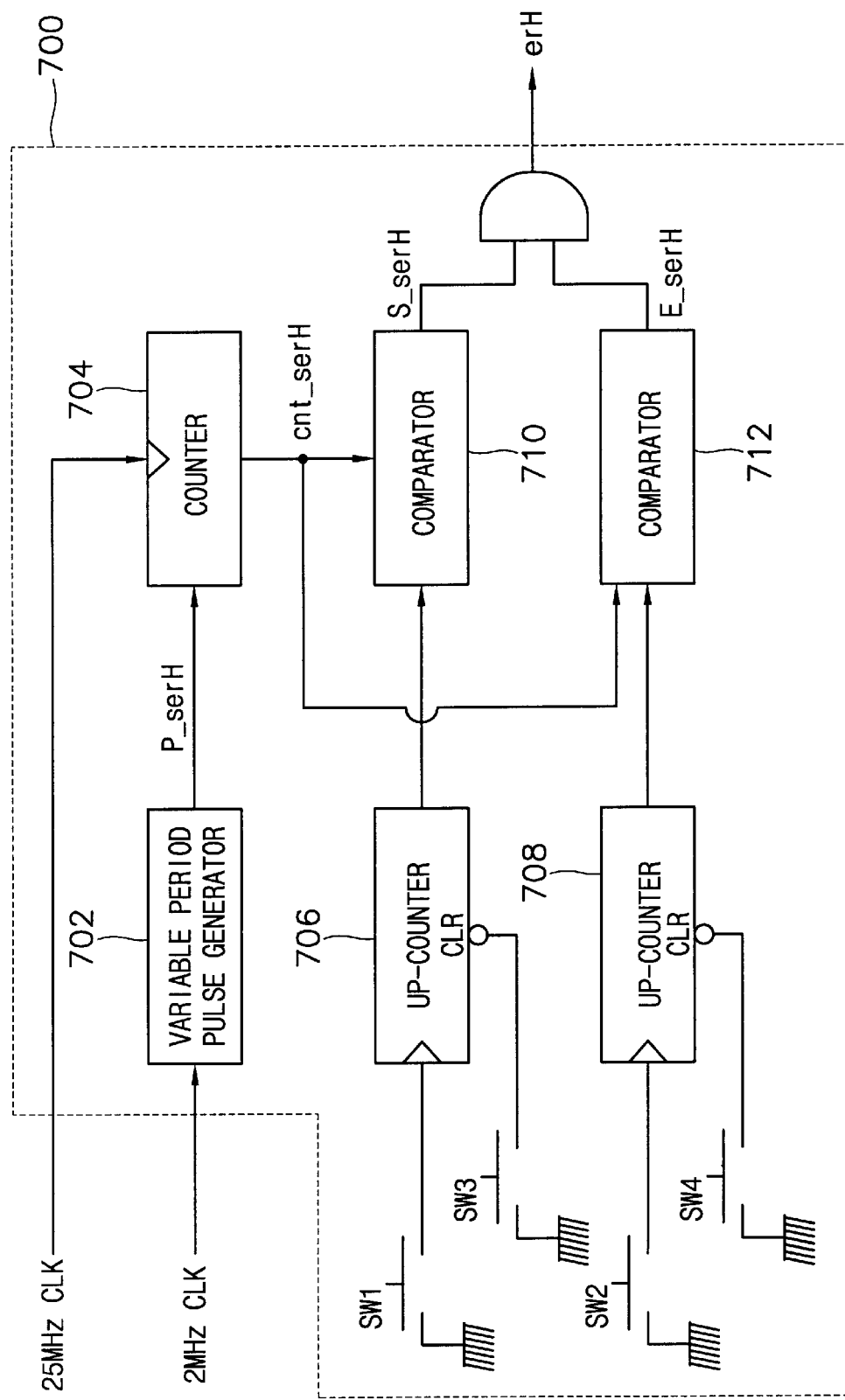
FIG. 5 is a block diagram for showing a circuit diagram of the control circuit capable of variably controlling a switching timing of the power recovery circuit according to an embodiment of the present invention.

Applying timing control circuit 700 shown in FIG. 5 generates applying control pulse erH for determining the applying timing of the recovery power of power recovery circuit 300. Applying timing control circuit 700 is designed in timing control section 170 and power recovery circuit 300 is designed in high voltage driving circuit section 180. Since applying timing control circuit 700 turns on applying FET Q2 by providing applying control pulse erH to power recovery circuit 300, the power recovered to capacitor C1 is applied to the X and Y electrodes. Applying timing control circuit 700 has a variableness range pulse generating section 702, a counter 704, a first switch SW1, a first up-counter 706, a second switch SW2, a second up-counter 708, a rising pulse generating section 710, a falling pulse generating section 712, and an AND-gate 714. Also, applying timing control circuit 700 has reset switchs SW3 and SW4 for resetting first and second up-counters 706 and 708.

First switch SW1 increases a count value of first up-counter 706 and second switch SW2 increases a count value of second up-counter 708. Two switches SW1 and SW2 are toggle switches and are installed to be switched by the user.

Variableness range pulse generating section 702 sets the maximum variableness range (time region) allowed in a case where the power applying timing is controlled according to the present invention. Variableness range pulse generating section 702 is operated by the first clock signal of 2 MHz applied from the system. Variableness range pulse generating section 702 generates a count enable signal corresponding to the maximum variableness range to enable counter 704.

Counter 704 counts the second clock signal of 25 MHz provided from the system and counts from 0 to 37 in the maximum variableness range of variableness range pulse generating section 702. That is, while a conventionally allowable maximum variableness range is 1.5 μs, counter 704 can count until 38 in a case of counting of the 25 MHz. Accordingly, counter 704 is preferably employed by a 5 bits binary counter. When a level of the enable signal is converted, counter 704 counts from 0. A frequency of the first and second clock signals are same as shown in FIGS. Accordingly, the frequency can be selected freely as long as the frequency of the second clock signal is higher than the first clock signal so that counter 704 can count 1.5 μs within the maximum variableness range.

First up-counter 706 counts a first reference value which determines a rising point of applying control pulse erH. The first reference value is variably determined according to the switching time of first switch SW1 and is reset to an initial value according to the switching operation of reset switch SW3. The initial value is either 0 or other values.

Rising pulse generating section 710 receives the first reference from first up-counter 706 and periodically compares the count value provided from counter 704 with the first reference value. Rising pulse generating section 710 outputs "low" before the count value is identical with the first reference value and outputs "high" when the count value from counter 704 reaches to the set count value.

Second up-counter 708 counts the second reference value which determines the falling point of applying control pulse erH. The second reference value is variably determined according to the switching time of second switch SW2 and is cleared to the initial value according to the switching operation of reset switch SW4. The initial value is either 0 or other values.

Falling pulse generating section 712 outputs "high" and compares the count value of counter 704 with the set count value of second up-counter 708. Falling pulse generating section 712 outputs "low" when the count value of counter 704 reaches to the set count value. Rising and Falling pulse generating sections 710 and 712 may be designed a comparator logic.

AND-gate 714 logically multiplies an output from rising pulse generating section 710 and an output from falling pulse generating section 712 and provides applying control pulse erH for applying the recovered power to the X and Y electrodes to an input terminal of power recovery circuit 300 shown in FIG. 3.

In the present invention, while the counter for determining the rising and falling timings of applying control pulse erH is the up-counter, the counter may be employed by a down counter or a preset counter.

Figure 6:
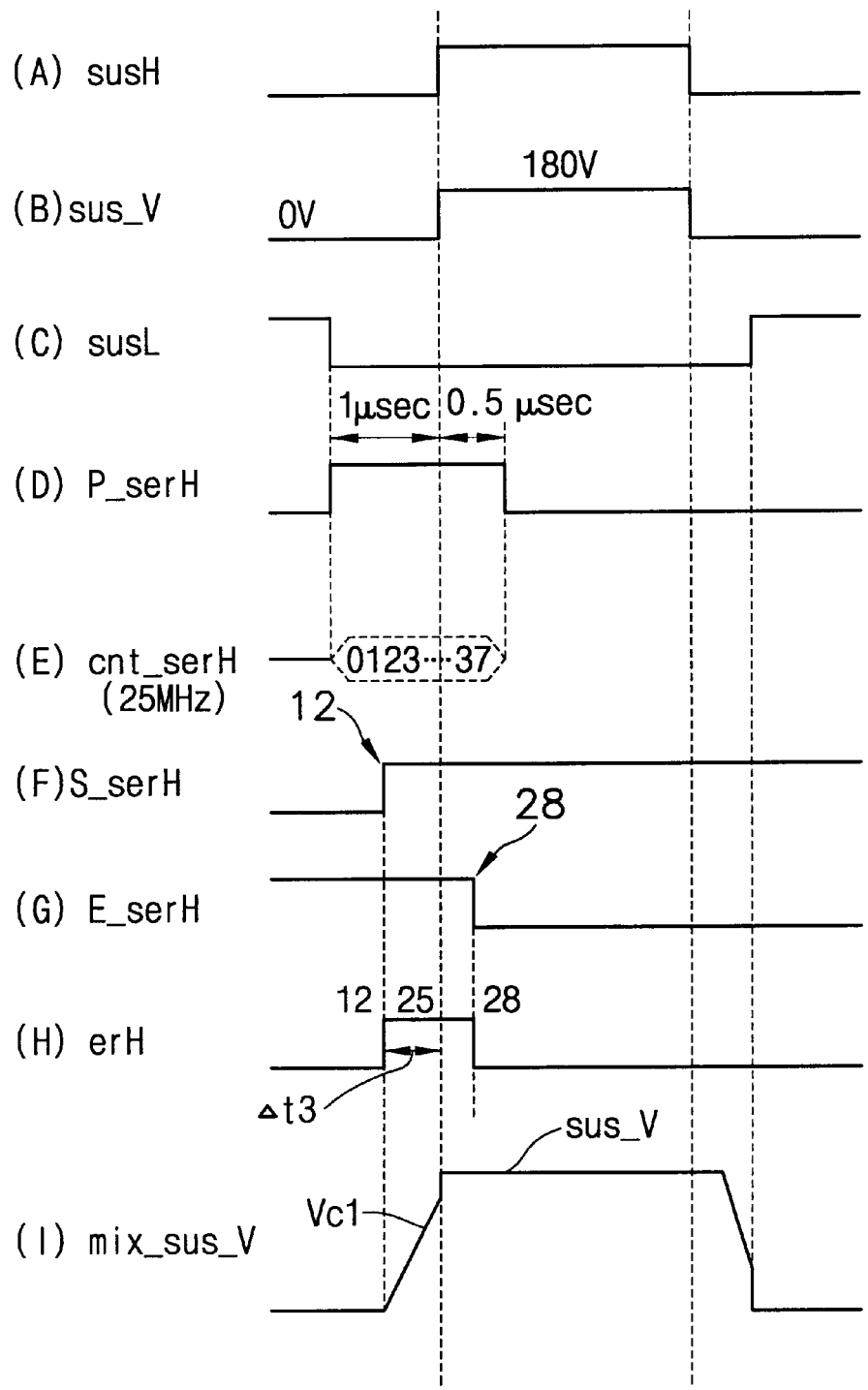
FIG. 6 is a timing diagram for showing waveforms of the signals relating to the present invention.

FIG. 6 is a timing diagram of the signals relating to applying timing control circuit 700 shown in FIG. 5. The DC high voltage outputted from DC voltage supplying section 190 is applied as sustentation voltage sus_V of the X and Y electrodes within an interval that sustentation voltage control pulse susH has a high level. Sustentation voltage sus_V is overlapped with recovery voltage Vc1 charged in capacitor C1 of power recovery circuit 300 and an overlapped voltage mix_sus_V is applied to the X and Y electrodes. The waveform shown in FIG. 6(B) represents logic control pulse susL for setting the sustentation voltage of other electrodes to a low level.

A counter enable signal P_serH outputted from variableness range pulse generating section 702 is a signal which varies the applying timing for determining the maximum range. The waveform shown in FIG. 6(C) represents a case where the maximum variableness range is 1.5 μs. That is, the maximum variableness range is faster than the rising edge of sustentation voltage control pulse susH by 1 μs and is slower than the falling edge of sustentation voltage control pulse susH by 0.5 μs. When the clock signal of 25 MHz is counted within the range of 1.5 μs, counter 704 outputs a signal cnt_serH which is sequentially counted up from the 0 to the 37.

FIG. 6(F) shows an output waveform S_serH outputted from rising pulse generating section 710. In a case where the first reference value from first up-counter 706 is set to 12 by the user, the output waveform is converted from low to high and is sustained in the high level when the output from counter 704 reaches to 12. FIG. 6(G) shows an output waveform E_serH outputted from falling pulse generating section 712. In a case where the second reference value from second up-counter 708 is set to 28 by the user, the output waveform is converted from high to low and is sustained in the low level when the output from counter 704 reaches to 28. Accordingly, When the output waveform S_serH from rising pulse generating section 710 is logically multiplied with the output waveform E_serH from falling pulse generating section 712, applying control pulse erH as shown in FIG. 6(H) is generated. When applying control pulse erH is supplied to power recovery circuit 300, voltage Vc1 recovered in capacitor C1 is solely applied to the electrodes from a point of which the second clock of the 25 MHz is counted 12 times from the starting point of count enable signal P_serH. Voltage Vc1 is overlapped with sustentation voltage sus_V and is applied to the electrodes from a point of which the second clock is counted 25 times.

At this time, the rising timing of applying control pulse erH is varied by the switching times of first switch SW1 and the falling timing thereof is varied by the switching times of second switch SW2. While the user watches the output screen of the PDP-TV, the user can determine the applying timing by controlling first and second switches SW1 and SW2. As described above, since the present invention can control the timing of applying control pulse erH for applying the recovered power to the electrodes, the user can set the applying timing corresponding to characteristics of each of the PDPs. Accordingly, in the PDP-TV, it is possible to efficiently use the power.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A method for controlling a power recovery of a plasma display panel television, which is capable of recovering a power applied to scan/sustentation electrodes, sustentation electrodes and address electrodes and applying the recovered power to the electrodes in response to a control signal, said method comprising the steps of:

1) setting a maximum variableness range of a recovery power supplying time;
 2) memorizing first and second reference values which respectively represent starting and stopping points of the recovery power supplying time;
 3) sequentially counting a predetermined clock signal from a starting point of the maximum variableness range within the maximum variableness range;
 4) periodically comparing a counted value counted in step 3) with the first and second reference values, respectively, and calculating a first time when the counted value is equal to the first reference value and a second time when the counted value is equal to the second reference value; and
 5) making the control signal for supplying the recovery power to the electrodes between the first time and the second time, wherein the first and second reference values are variably set from an outside.

2. An apparatus for controlling a supplying timing of a power recovery of a plasma display panel television, which is capable of recovering a power applied to scan/sustentation electrodes, sustentation electrodes and address electrodes and applying the recovered power to the electrodes in response to a control signal, said apparatus comprising:

a first means for generating a variableness range pulse which sets a maximum variableness range of a recovery power supplying time;
 a second means for counting a first clock pulse and for periodically outputting the counted value in response to the variableness range pulse;
 a third means for generating a first reference value which sets a rising timing of the control signal;
 a fourth means for generating a second reference value which sets a falling timing of the control signal;
 a fifth means for periodically comparing the counted value with the first reference value and for converting a logic level of an output signal from a low level into a high level when the counted value is equal to the first reference value;
 a sixth means for periodically comparing the counted value with the second reference value and for converting the logic level of an output signal from the high level into the low level when the counted value is equal to the second reference value; and
 a seventh means for logically multiplying the output signal from said fifth and the output signal from said sixth means to generate the control signal, wherein the first and second references values are variably set from an outside.

3. The apparatus as claimed in claim 2, wherein said third means comprises a first switching means for executing a switching operation by a first predetermined time set from the outside and a first counting means for counting switching times of said first switching means and for generating the first reference value.

4. The apparatus as claimed in claim 2, wherein said fourth means comprises a second switching means for executing a switching operation by a second predetermined time set from the outside and a second counting means for counting switching times of said second switching means and for generating the second reference value.

* * * * *